Oct. 19, 1943.   R. P. NORTON   2,332,394
DEVICE FOR RESEATING VALVE GATES
Filed Feb. 17, 1941   3 Sheets-Sheet 1

Inventor
Raymond P. Norton

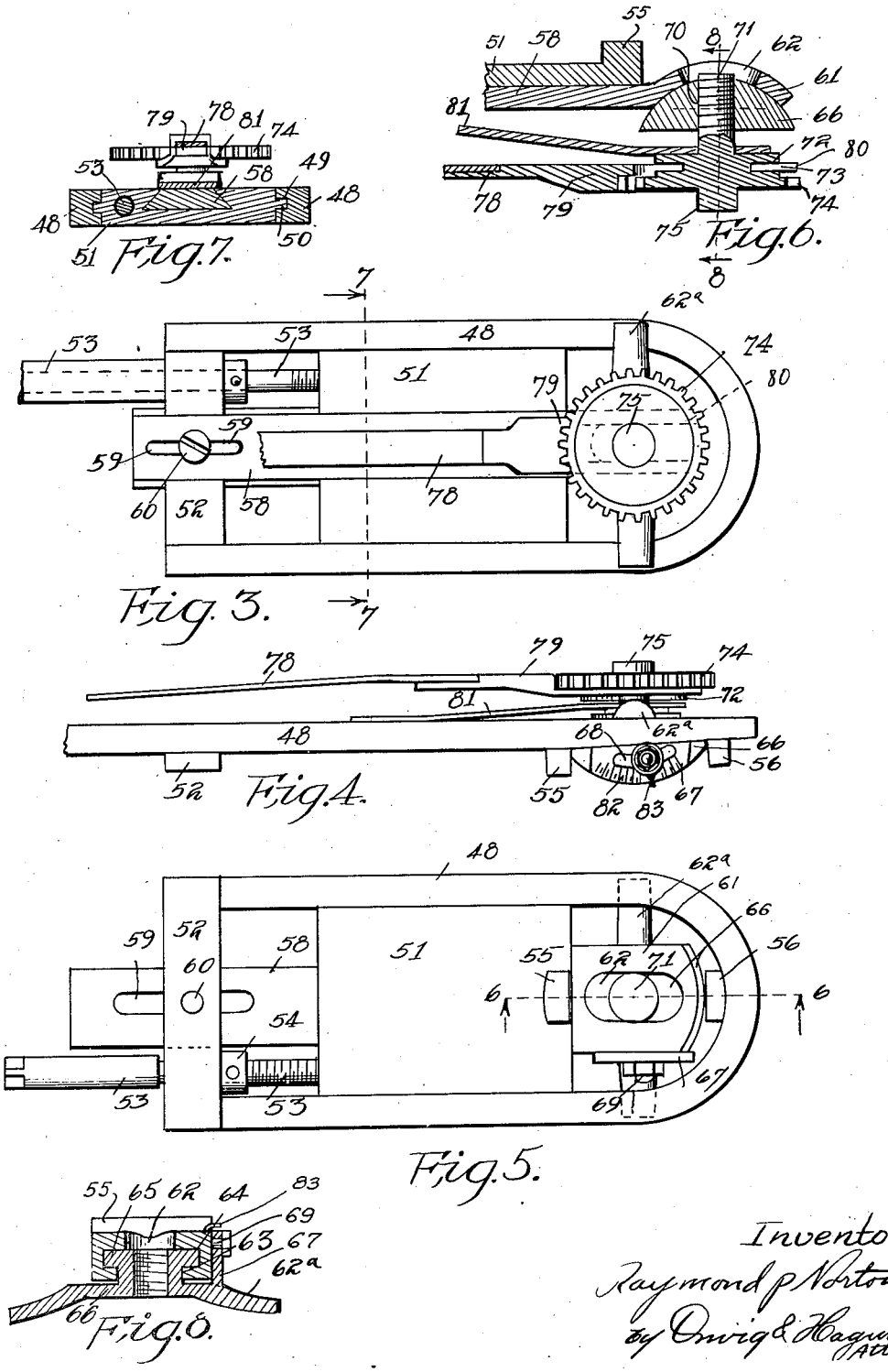

Oct. 19, 1943.  R. P. NORTON  2,332,394
DEVICE FOR RESEATING VALVE GATES
Filed Feb. 17, 1941  3 Sheets-Sheet 3
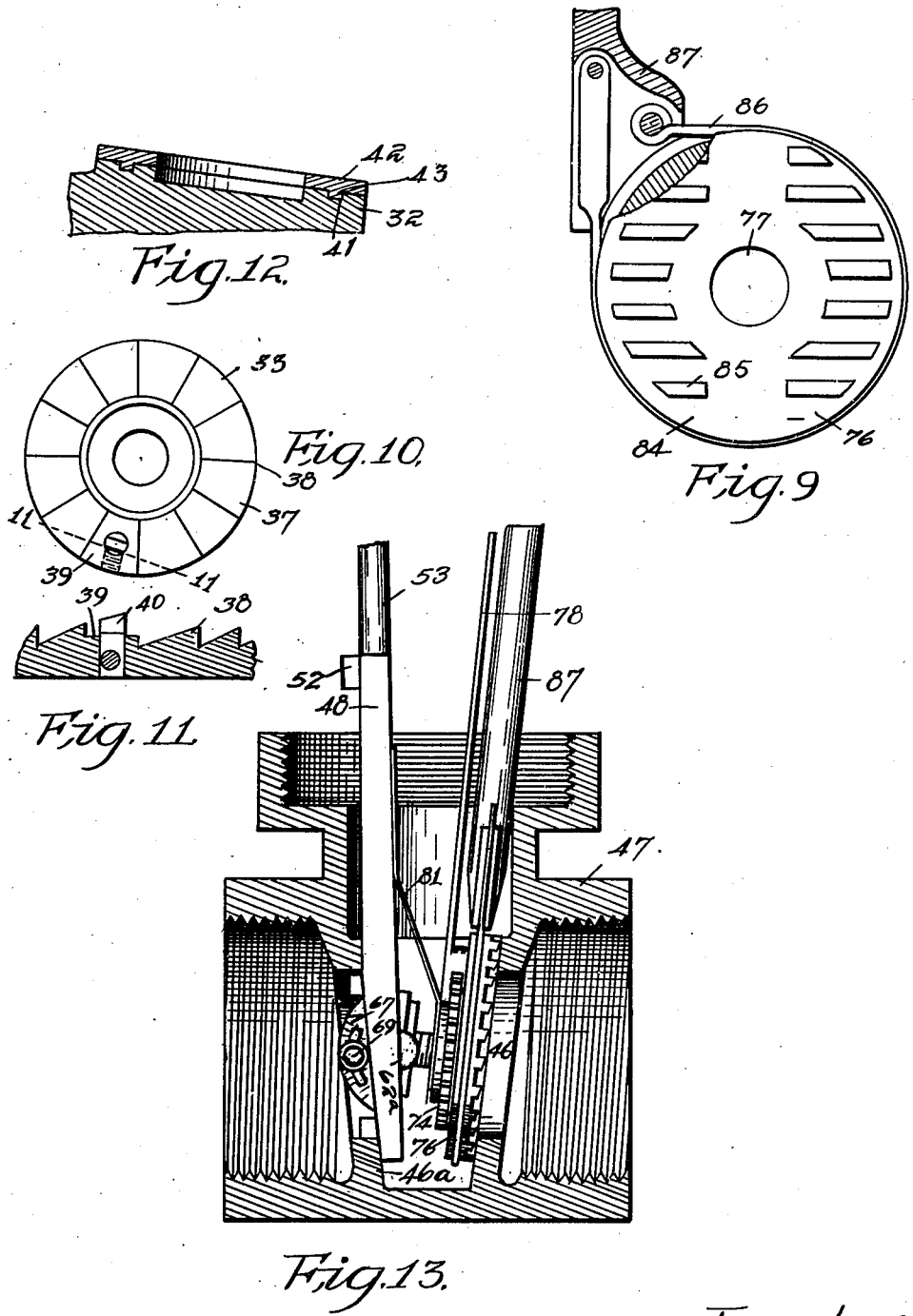
Inventor
Raymond P. Norton Patented Oct. 19, 1943

2,332,394

UNITED STATES PATENT OFFICE 2,332,394

DEVICE FOR RESEATING VALVE GATES

Raymond P. Norton, Algona, Iowa

Application February 17, 1941, Serial No. 379,221

12 Claims. (Cl. 90—12.5)

This invention relates to improvements in the art of reseating and dressing valve seats, and more particularly to that type commonly known as a "gate valve." In this type of valve the gate, or valve proper, is usually wedge shaped, having on each of its inclined surfaces an annular seat portion, each adapted to engage and cooperate with a corresponding seat portion carried by the valve casing, the gate, or valve, being removed from the casing when its seats are refinished, said refinishing being accomplished by a suitable cutting tool, the valve seats of the casing being dressed by means of a separate tool at the time the said valve is removed.

A number of difficulties are usually experienced in the dressing of the valve gate and the seats, this being particularly so when the valve gate seats are badly worn and pitted and require the removal of a considerable amount of material, in which case the wedge or valve will become thinner and enter the space between the casing seats to a greater depth and oftentimes to such an extent that the annular seat portion of the wedge will not concentrically register with the annular seat portions of the casing, and oftentimes to such an extent that proper seating of the gate is impossible.

Other difficulties have been experienced in removal of the gate and dressing it separately from the seats of the casing, in that it is almost impossible to dress the seats of the gate to exactly the same angle as the seats of the casing, so that the gate will be properly seated therein. It is, therefore, the object of my invention to provide in a tool for dressing the seats of gate valves, means whereby the seats of the gate may be ground to the same, or substantially the same, angle of the original seats, and whereby the seats of the valve gate will be ground to exactly the same angle as the seats of the valve casing, so that the gate will fit the seats of the casing without applying excessive pressure to the gate when closing the same.

A further object of my invention is to provide in a valve dressing tool, means wherein badly worn and pitted seats of a valve gate may be removed and new seats substituted therefor, and of such thickness as to compensate for the amount of material removed from the seats of the casing, wherein the two sets of cooperating seats will permit the gate to set into the same position as it occupied in the original grinding.

More specifically, it is the object of my invention to provide a tool for dressing the seats of valve gates, including a supporting base and a cutter, with means for clamping the gate to the base, means for easily and quickly adjusting the angle of the cutter to the angle of the seat to be dressed, and in connection therewith, means for determining and visually indicating the relative angle between the base and said cutter, to thereby indicate the angle of the seat faces of the valve gate one relative to the other.

A further object is to provide in a tool for dressing the seats of a casing supporting a valve gate employing a supporting frame with means for securing the frame against one of said casing seats, and a rotatable disc-like cutter, for dressing the opposite casing seat, means wherein the plane of the rotation of said cutter may be varied relative to the said base and fixed to rotate in said plane, and including means for visually indicating said angle of adjustment, whereby the cutter may be adjusted to the proper cutting angle to correspond with the original angle of the seats of the valve, before the cutting tool is placed in operative position, or to the angle of a previously ground valve gate.

A further object is to provide in a valve tool for dressing a valve gate, improved means for reseating the gate to compensate for the material removed.

Referring to the accompanying drawings—

Figure 3 is a plan view of the tool supporting frame for supporting the tool for resurfacing the seats of the valve casing;

Figure 4 is a side elevation of same;

Figure 5 is a bottom view of Figure 4;

Figure 6 is an enlarged detail sectional view taken on the line 6—6 of Figure 5;

Figure 7 is a detail sectional view taken on the line 7—7 of Figure 3;

Figure 8 is a detail sectional view taken on the line 8—8 of Figure 6;

Figure 9 is a side elevation of the cutter for reseating the seats of the valve casing, portions being broken away;

Figure 10 is a plan view of the cutter for resurfacing the seats of the gate;

Figure 11 is an enlarged detail sectional view taken on the line 11—11 of Figure 10;

Figure 12 is a detail sectional view of one of the seats of the gate, showing the manner in which a new seat portion is applied;

Figure 13 is a sectional view of a valve casing, showing the manner in which the tool-supporting frame and the cutting tool are assembled and applied to said casing for refinishing one of the seats thereof;

Figure 2:
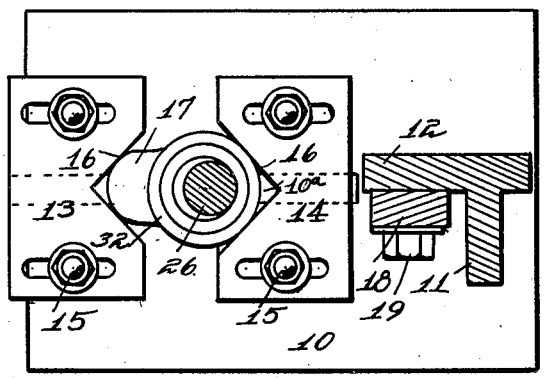
Figure 2 is a detail sectional view taken on the line 2—2 of Figure 1.

I will first describe that portion of my device by means of which the angle of the seats of the gate may be determined and the mechanism by means of which a portion of said seats may be removed for receiving a new seat portion, said device comprising a base 10 having its upper surface finished, smoothed evenly and provided with a groove 10a, one end of said upper surface being provided with an upright post 11 having a forwardly extending flange 12. The base 10 is also provided with two blocks 13 and 14, each having a tongue 14a mounted in said groove 10a, which blocks are adjustably mounted to move toward and from each other by means of bolts 15, the inner edge of each of said blocks being provided with a V-shaped notch 16 for receiving between them a valve gate 17, one of the seats of the said gate resting on the base 10, said clamps 13 and 14 providing means for holding the valve gate against horizontal movement while the resurfacing operation takes place.

For supporting the resurfacing tool and for rigidly clamping the gate in position against vertical movement I have pivotally supported, adjacent to one face of the member 12, a plate 18 by means of a bolt 19 at its lower end, the plate 18 having slots 20 for receiving bolts 21, by means of which the angle of the plate 18 may be adjusted. The inner edge of the plate 18 is provided with bearing members 22 and 23, the lower end of the bearing member 23 being provided with a downwardly extending tubular portion 24 having its outer surface screw threaded, the said member 23 having an opening 25 projecting through said tubular portion for slidably receiving a shaft 26, the upper end of said shaft being provided with a screw threaded opening 27 for receiving a threaded shaft 28, the upper end of which is rotatably mounted in the bearing 22 and held against longitudinal movement by means of collars 29, a hand wheel, or crank, 30 being mounted on the upper end of said shaft for rotating the same. By this arrangement it will be seen that rotation of the shaft 28 will cause the shaft 26 to be elevated and lowered in the opening 25, the lower end of the shaft being adapted to engage the central portion of the gate 17 to firmly hold it against vertical movement, in the manner illustrated in Figure 16.

Figure 16:
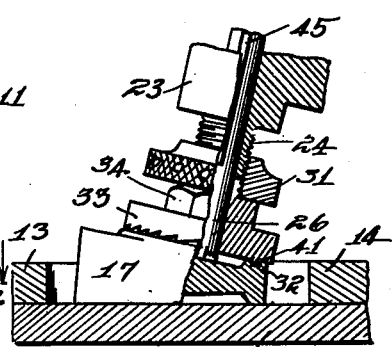
Figure 16 illustrates the manner in which the cutter is mounted on the supporting shaft and the manner in which said shaft clamps the valve to its support.

The sleeve 24 is provided with a disc 31 which has its under surface finished at right angles to said sleeve, the said disc 31 providing means whereby the angle of the shaft 26 may be adjusted to position at right angles to the upper gate seat 32 by lowering said disc to position to engage said seat and then adjusting the angle of the plate 18 until the under face of the member 31 is parallel with and engaging said gate seat. This plate 31 may also be used for centering the valve gate 17 before the nuts on the bolts 15 are tightened, thus providing means whereby the shaft 26 will be exactly at right angles to the surfaces of said seat for supporting the cutter 33 for redressing said seat which is rotatably mounted thereon, as illustrated in Figure 16. The plate 31 also provides means for applying downward pressure to the cutter 33 which is rotated on the shaft 26 by means of a suitable wrench applied to the nut portion 34 of said cutter. A graduated scale 35 is secured to the plate 18 to operate in conjunction with an index member 36 carried by the support 11, thereby providing means for determining the angle of the seats of the gate 17, one relative to the other, at the time the seat of said valve is dressed.

The cutter 33 is illustrated in Figures 10 and 11, which consists of an annular portion 37 having radial teeth 38 and a flattened surface 39 for supporting a cutting tooth 40, which is extended downwardly a slight distance from the under surface of the teeth 38, so that an annular groove 41 may be cut in the seat 32. A new annular seat portion 42 may then be applied to the upper surface of the finished seat 32, having a downwardly extending flange 43 for entering the groove 41, as illustrated in Figure 12.

By this construction it will be seen that the shaft 26 provides means for firmly holding the gate 17 to the base 10, and also means for supporting the cutter 33, thus providing means whereby the valve gate will be rigidly supported on the base and the shaft rigidly supported on the valve gate, so that chattering and vibration will be eliminated as the cutter 33 is operated for the removal of the old seat. The worn and pitted condition of the seat tends to increase the tendency of the members to chatter as the cutter is operated, this being entirely eliminated by the above construction. The shaft 26 is provided with a spline 45 to prevent rotation of the same with the shaft 28.

For finishing the seats 46 and 46a of the valve casing 47 at angles corresponding to the angles of the seats 32, I have provided the following mechanism:

Referring to Figures 3 to 8, inclusive, a cutter-supporting frame 48 is provided, which is substantially U-shaped, having its inner edge provided with a groove 49 for receiving tongues 50 of a slide block 51, the outer ends of the said members 48 being held in fixed relation with each other by means of a cross bar 52. The block 51 is moved longitudinally within said frame by means of a screw threaded shaft 53 extending through the bar 52 and provided with a collar 54 for preventing longitudinal movement, the inner end of the block 51 having a downwardly projecting lug 55, while the bight portion of the frame 48 is provided with a downwardly extending lug 56, said lugs 55 and 56 being designed to enter the opening of one of the seats, illustrated as 46a in Fig. 13, and for clamping the frame in position adjacent to the seat, by simply moving the block 51 outwardly by means of the screw 53, in the manner illustrated in Figure 13.

Dovetailed in the bar 52 and in the block 51 I have provided a bar 58 having a slot 59, with a set screw 60, for locking the bar in any of its adjusted positions, the inner end of the bar 58 terminating in a curved portion 61 (see Fig. 6), having a slot 62 and a slot 63 (see Fig. 8), the side walls of the slot 63 being provided with arcuate slots 64 for receiving the flanges 65 of a block 66, said block 66 having an upwardly extending arm 67 provided with a slot 68 for receiving an adjusting bolt 69. The block 66 is provided with a threaded opening 70 for receiving a threaded bolt 71, one end of said bolt terminating in a disc 72, having a groove 73, and finally a gear portion 74, the under portion of the gear portion 74 being provided with a hub 75, the hub 75 and the adjoining outer surface of the gear 74 providing means for supporting the disc-like cutter 76 which is provided with an opening 77 for receiving said hub 75. The mechanism thus just described provides means whereby the angle of the cutter 76, when supported on the gear, may be adjusted relative to the frame member 48 by simply loosening the set screw 69, then adjusting the angle of the block 66 relative to the member 62, the flanges 65 serving to rigidly hold the block in its radial movement, while the set screw 69 serves to hold the block against rotative or circumferential movement, the threaded bolt 71 serving to force the gear 74 outwardly against the cutter 76 when placed in the valve casing, as indicated in Figure 13, simply by rotating the said bolt by means of the gear 74. The member 66 is provided with laterally projecting lugs 62a adapted to rest on the frame members 48, so that pressure applied by the screw 71 will be applied to said frame by said lugs and thereby release the block 51 of said pressure.

For rotating said gear after the frame 48 and the cutter have been placed in the casing, I have provided a handle 78 having at one end a toothed sector 79, the teeth of which are designed to be moved into and out of engagement with the teeth of the gear 74, by simply moving the handle 78 longitudinally, said sector 79 being supported by a slotted plate 80 adapted to travel in a groove 73 before mentioned. By this arrangement it will be seen that the handle 78 may be moved inwardly until the sector 79 engages the teeth of the gear 74, after which rotary or swinging movement may be imparted to said handle, causing the gear 74 to rotate. The handle may then be moved outwardly and swung to a new angular position and again moved inwardly as before described.

A spring 81 is provided and fixed to the frame 48, having the other end slotted and designed to engage the inner face of the member 72 to frictionally retain the gear 74 against rotation at the time the handle 78 is oscillated with the toothed sector 79 out of engagement with the gear 74.

The plate 67 is provided with a graduated scale 82, while an index member 83 is carried by the member 62, thereby providing means whereby the angle of the cutter supporting face of the gear 74 may be registered relative to the angle of that portion of the face of the frame 48 engaging the valve seat 46a, thereby providing means whereby the angle of the seats of the valve gate 17 may be determined by the scale 35, and whereby the scale 82 is so graduated that the cutter-supporting surface of the gear 74 may be set at a corresponding angle relative to the frame 48, and whereby the proper cutting angle of the said gear 74 may be pre-determined and set before the frame 48 is placed in the casing 47, and further to provide means whereby the operator will always be able to obtain finished seats in the casing to correspond to the angularity of the seats of the gate, with a minimum amount of labor and with great accuracy, to insure a perfect fit between the gate and its casing seats.

The tool 76, which is of ordinary construction, simply comprises a disc 84 having teeth 85 formed on one surface and its other surface finished to fit against the outer surface of the gear 74, as clearly illustrated in Figure 13, with the hub 75 entering the opening 77 of said disc. The cutter is rotated by means of the clutch band 86 and a handle 87, which is also of ordinary construction, wherein by oscillating the handle 87 the said cutter is rotated.

Figure 15:
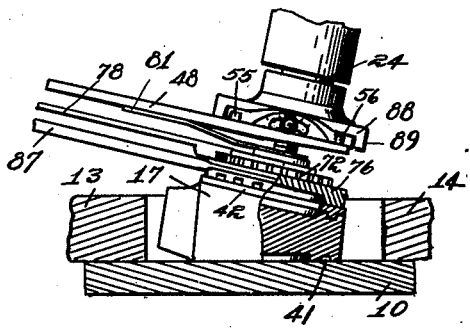
Figure 15 illustrates the manner in which the tool for dressing the seats of the casing may be applied for dressing the seats of the gate.
Figure 1:
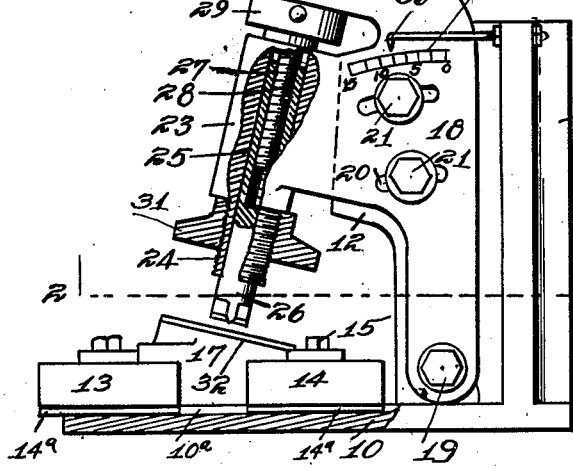
Figure 1 is a side elevation of that portion of my device for aligning and clamping the valve gate in operative position and for determining the angle of the faces of the seats of said valve gate, a portion being broken away to illustrate the interior construction.

In Figure 15 I have illustrated the manner in which the frame 48 and the cutter 76 may be supported to finish the outer surface of a new seat portion 42, previously mentioned in connection with Fig. 12, by simply providing a disc 88 and threading the same on the sleeve 24 after the member 31 has been removed, said member 88 having a flange 89 for engaging the frame member 48 and for receiving the lugs 55 and 56, wherein the said frame member 48 may be rigidly clamped to said flange 89 while the cutter is rotated on the seat portion 42.

Figure 14:
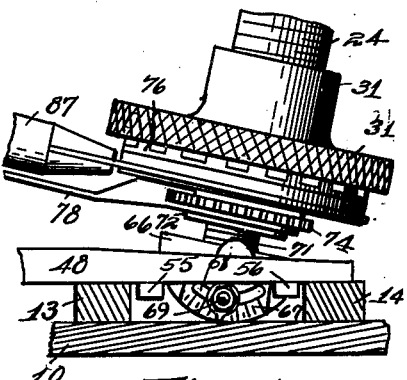
Figure 14 illustrates one means whereby the angle of the means mounting the cutter may be adjusted relative to its supporting frame to correspond to the angle of the seat surfaces of the gate.

In Figure 14 I have illustrated another manner in which the angle of the gear 74 may be adjusted relative to the frame 48 without the use of the scales 35 and 82, by simply placing the frame 48 on top of the blocks 13 and 14, and then adjusting the angle of the gear 74 with the cutter 76 in place to fit the under surface of the disc 31, after which the set screw 69 may be tightened and the cutter removed and applied to the casing 47 in the manner before described.

Thus it will be seen I have provided a means whereby the seats of the valve gate and the corresponding seats in the casing may be accurately dressed, and wherein the valve gate will properly be seated when placed in position, and wherein the worn and pitted seats of the gate may be easily and quickly provided with new seats of such thicknesses as to compensate for the material removed from the valve gate and the valve gate casing seats, and wherein the valve gate will properly be seated when placed in position, thus providing means whereby valve gate and corresponding valve casing may be easily and inexpensively seated without removing the valve casing from the pipe line in which it is included, and thereby effecting a great saving to the owners.

I claim as my invention:

1. In a device of the class described, an elongated cutter supporting frame, means for attachably and detachably securing one end of said frame within the valve casing of a gate valve adjacent to one of its seats, a rotatable disc-like cutter, a cutter-supporting plate, including a pivot member for pivotally supporting said cutter with its back face against said plate, means for adjustably mounting and locking said plate to said frame and to move toward and from the opposite seat of said casing, and at a pre-determined angle relative to said frame and substantially parallel with the seat to be dressed, means for adjusting said plate-mounting means longitudinally of said frame for centering said cutter relative to said valve seat, and means for rotating said cutter.

2. In a device of the class described, an elongated cutter supporting frame, means for attachably and detachably securing one end of said frame within the valve casing of a gate valve adjacent to one of its seats, a cutter-supporting plate including a pivot member carried by said frame, a rotatable disc-like cutter mounted on said pivot with its back against said plate, means for adjustably mounting and locking said plate to said frame and to move toward and from the opposite side of said valve casing at a pre-determined angle relative to said frame and substantially parallel with said seat, and means for rotating said cutter.

3. In a device of the class described, a base adapted to support one face of a gate valve gate, a gauge plate adjustably mounted above said base, means carried by said base adjustably mounting said gauge plate above said base to receive a valve gate between said base and gauge plate, with one of its faces resting on said base and the other in contact with and parallel to the gauge plate, means for indicating and registering the angularity of said gauge plate relative to said base, whereby the angularity of the faces of said valve gate, one relative to the other, may be accurately determined, a tool for dressing the seat of a casing for receiving the said valve gate, including a frame member having a seat portion adapted to rest on the seat of said casing, and a rotatable cutter adapted to dress the other seat of said casing, means carried by said frame whereby the plane of rotation of said cutter may be varied relative to the seat portion of said frame, means for indicating the angularity of the cutter face relative to said seat portion, whereby the relative angle of the seat faces of the valve gate may be first determined, and whereby the angle of the cutting face of the cutter may be set to the corresponding angle relative to the base, so that the seats of the valve casing may be dressed to fit the faces of the valve gate.

4. In a device of the class described, a base for supporting the under surface of a wedge-shaped valve gate, means for clamping said valve gate to said base against horizontal movement, means for clamping said valve gate to said base against vertical movement, a gauge plate adapted to contact the upper surface of said valve gate, means for adjusting the angle of said gauge plate relative to said base, means for locking said adjusting means to any one of a number of adjustable positions, said gauge plate being adjustably mounted on the last said means to move toward and from said valve gate, a valve gate seat removing tool and means for rotatably mounting said valve seat removing tool on said adjustable mounting means, to rotate in a plane parallel with said gauge plate, whereby the worn seat of a valve gate may be removed, with the new surface parallel with the original valve gate seat.

5. In a device of the class described, a base for supporting the under surface of a wedge-shaped valve gate, means for clamping said valve gate to said base against horizontal movement, means for clamping said valve gate to said base against vertical movement, a gauge plate adapted to contact the upper surface of said valve gate, means for adjusting the angle of said gauge plate relative to said base, means for locking said adjusting means to any one of a number of adjusted positions, means indicating the angle of said gauge plate relative to said base, said gauge plate being adjustably mounted to move toward and from said valve gate, a valve gate seat removing tool and means for rotatably mounting said valve gate seat removing tool on said adjustable mounting means, to rotate in a plane parallel with said gauge plate, whereby the worn seat of a valve gate may be removed, with the new surface parallel with the original valve gate seat.

6. In a device of the class described, a valve dressing device, comprising a horizontal base adapted to support one face of a wedge-shaped valve gate, means for clamping said valve gate to said base against horizontal movement, means for applying downward pressure to the upper portion of said valve gate to force the valve gate against said base, comprising a shaft having one end engaging said valve gate, means adjustably carried by said base for supporting said shaft to permit the angle of its longitudinal axis to assume various positions relative to said base, means carried by said adjustable carrier means for applying longitudinal pressure to said shaft to firmly clamp said valve gate to said base, a disc-like cutter rotatably mounted on said shaft with its cutting face engaging the upper seat of said valve gate, and means for applying cutting pressure to said cutter as it is rotated.

7. In a device of the class described, a base adapted to support one face of a valve gate, a shaft for rotatably supporting a valve gate refacing tool, means adjustably supporting said shaft to position at right angles to the seat of said valve gate to be dressed, whereby the tool will reface a new surface parallel with the original seat, said shaft being mounted to move longitudinally with one end engaging said valve seat, and means for applying pressure to said shaft for firmly supporting the valve gate against the base as the refacing operation takes place.

8. In a device of the class described, a supporting frame, including a base for supporting one face of a double faced valve gate, a clamping shaft supported at right angles to the opposite face of said valve gate and mounted to move toward and from said valve gate into and out of contact therewith, means for holding the inner end of said shaft in contact with said valve gate, a cutter mounted to rotate on said shaft as an axis to dress the opposite face of said valve gate, means for rotating said cutter, and means for applying pressure to said cutter as it is rotated.

9. In a device of the class described, a supporting frame, including a base for supporting one face of a double faced valve gate, a clamping shaft supported at right angles to the opposite face of said valve gate and mounted to move toward and from said valve gate into and out of contact therewith, means for holding the inner end of said shaft in contact with said valve gate, means carried by the base for clamping said valve gate against lateral movement, a cutter mounted to rotate on said shaft as an axis to dress the adjacent face of said valve gate, means for rotating said cutter, and means for applying pressure to said cutter as it is rotated.

10. In a device of the class described, a base, including an upright support, a pair of clamps for securing a double-faced valve gate between them with one face resting on said base, an upright frame having its lower end pivoted to said upright and its upper end adapted to be adjusted to various angles relative to the vertical, a shaft slidably mounted in said frame to move toward and from said valve gate, means for moving said shaft downwardly so that its lower end engages the upper face of said valve gate, a cutter rotatably mounted about the lower end of said shaft as an axis, means for locking said frame in an adjusted position, means for rotating said cutter, and means for applying pressure to said cutter as it is rotated.

11. In a device of the class described, a frame for supporting a cutter for dressing the seats of a valve gate, said frame having a portion adapted to engage and be fixed to one of the seats of said valve gate, a cutter adapted to engage and dress the other seat of said valve gate, means for supporting said cutter to rotate in a plane at a fixed predetermined angle relative to the seat-engaging portion of said frame and substantially parallel to the seat being dressed, means carried by said frame for adjusting the angle of said cutter-supporting means relative to the seat-engaging portion of said frame, and means for rotating the cutter.

12. In a device of the class described, a frame for supporting a cutter for dressing the seats of a valve gate, said frame having a portion adapted to engage and be fixed to one of the seats of said valve gate, a cutter adapted to engage and dress the other seat of said valve gate, means for supporting said cutter to rotate in a plane at a fixed predetermined angle relative to the seat-engaging portion of said frame and substantially parallel to the seat being dressed, graduated means for indicating the angularity of said cutting frame relative to the seat-engaging portion of said frame, means carried by said frame for adjusting the angle of said cutter-supporting means relative to the seat-engaging portion of said frame, and means for rotating the cutter.

RAYMOND P. NORTON.